United States Patent
Sakai

(10) Patent No.: US 8,094,913 B2
(45) Date of Patent: Jan. 10, 2012

(54) IMAGE PROCESSING DEVICE FOR PROCESSING IMAGE HAVING LUMINANCE INFORMATION, AND CONTROL METHOD THEREOF

(75) Inventor: Keiichi Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 11/235,987

(22) Filed: Sep. 26, 2005

(65) Prior Publication Data

US 2006/0067587 A1    Mar. 30, 2006

(30) Foreign Application Priority Data

Sep. 27, 2004   (JP) ................. 2004-280438

(51) Int. Cl.
*G06K 9/00* (2006.01)
(52) U.S. Cl. ...................................... 382/132
(58) Field of Classification Search .......... 382/128–131, 382/266, 269, 299; 345/3.3, 596; 358/1.2, 358/1.9, 3.03–3.19, 3.27, 534, 535
See application file for complete search history.

(56) References Cited

U.S. PATENT DOCUMENTS

| | | | |
|---|---|---|---|
| 5,761,344 A * | 6/1998 | Al-Hussein | 382/237 |
| 5,982,919 A * | 11/1999 | Maruo | 382/141 |
| 6,178,272 B1 * | 1/2001 | Segman | 382/298 |
| 6,373,990 B1 * | 4/2002 | Ushida et al. | 382/252 |
| 6,850,653 B2 * | 2/2005 | Abe | 382/312 |
| 6,934,409 B2 * | 8/2005 | Ohara | 382/132 |
| 7,003,166 B2 * | 2/2006 | Abhyankar et al. | 382/237 |
| 7,298,928 B2 * | 11/2007 | Huang et al. | 382/299 |
| 7,379,624 B2 * | 5/2008 | Hoshi | 382/299 |
| 7,385,615 B2 * | 6/2008 | Vale et al. | 345/660 |

FOREIGN PATENT DOCUMENTS

JP    2002-333974    * 11/2002

* cited by examiner

*Primary Examiner* — Gregory M Desire
*Assistant Examiner* — Andrae S Allison
(74) *Attorney, Agent, or Firm* — Cowan, Liebowitz & Latman, P.C.

(57) ABSTRACT

An image processing device by which a user can operate a window level value without being conscious of a photometric interpretation of an image is provided. In the image processing device, the operation direction for increasing or decreasing the window level value is reversed according to the photometric interpretation of the input image, according to whether the window level operation direction is the right-and-left direction or the up-and-down direction, and according to whether or not to execute the grayscale inversion.

7 Claims, 18 Drawing Sheets

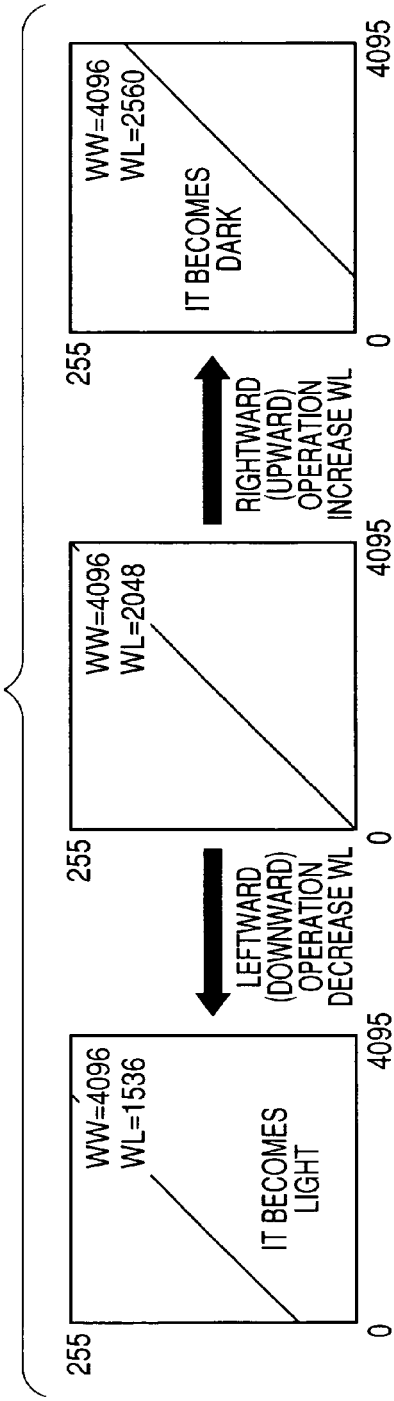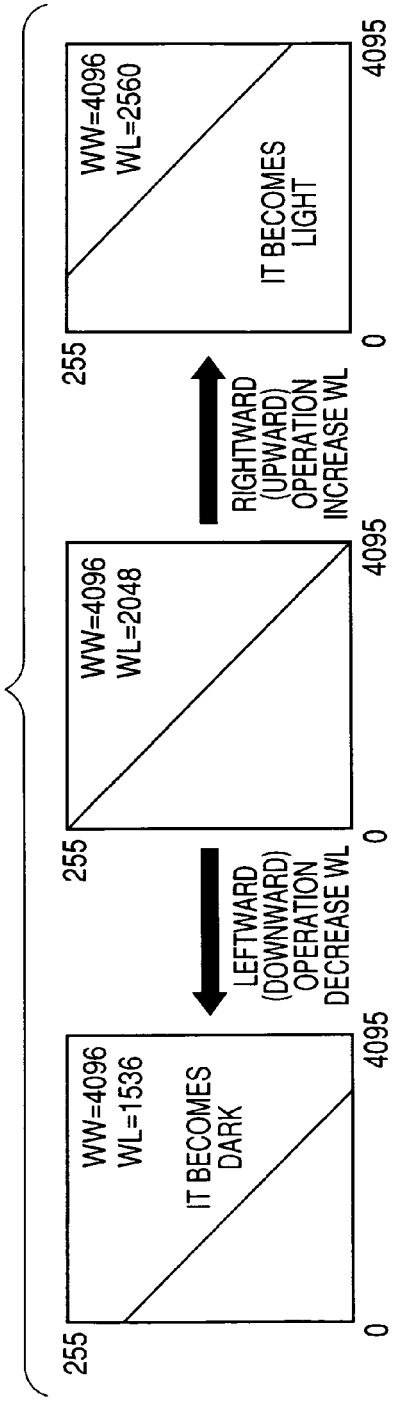

MONOCHROME 1

MONOCHROME 1 (GRAYSCALE INVERSION)

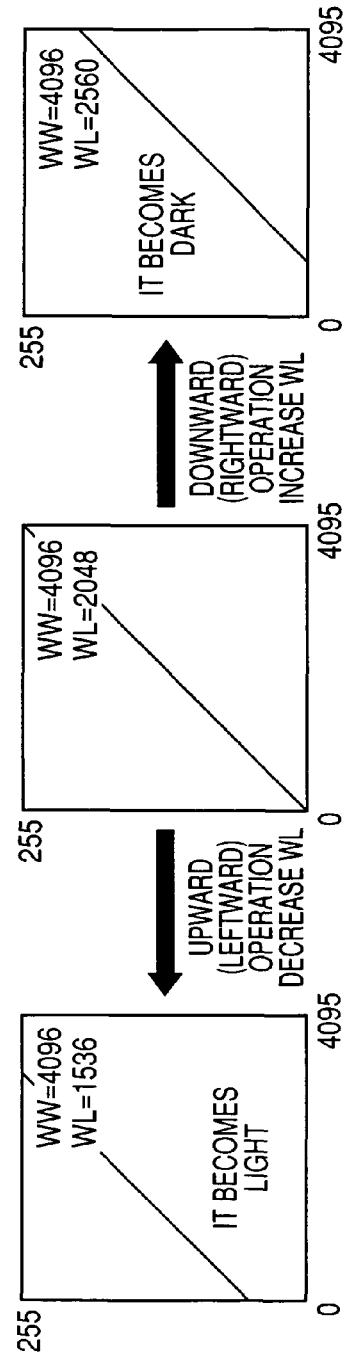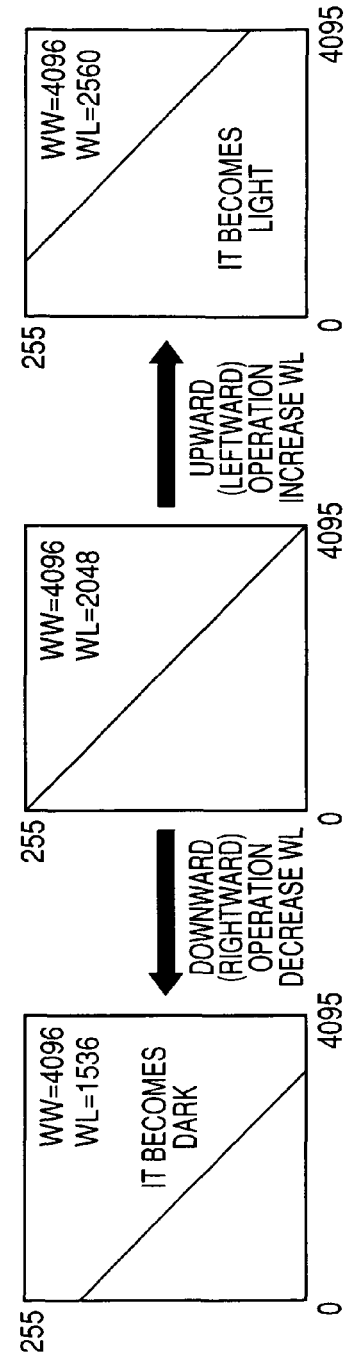

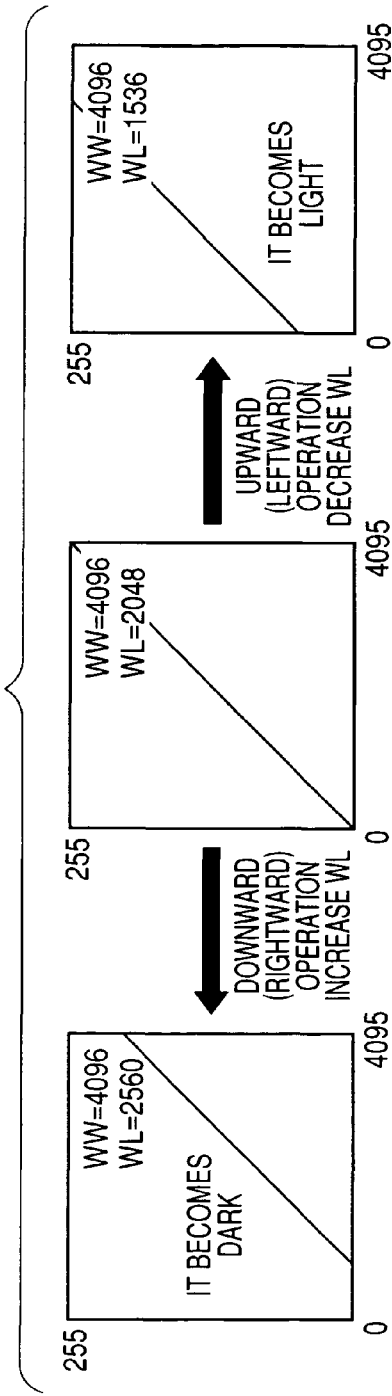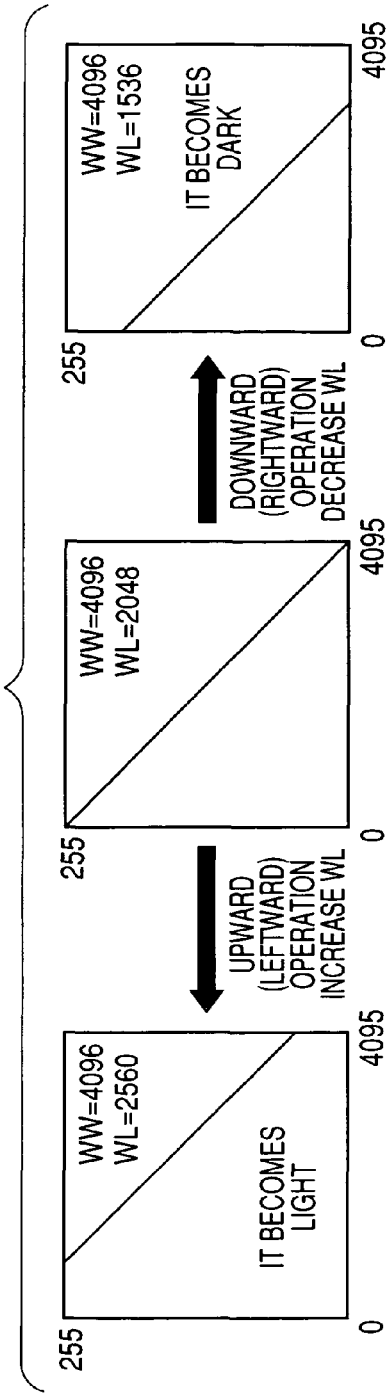

MONOCHROME 2

MONOCHROME 2 (GRAYSCALE INVERSION)

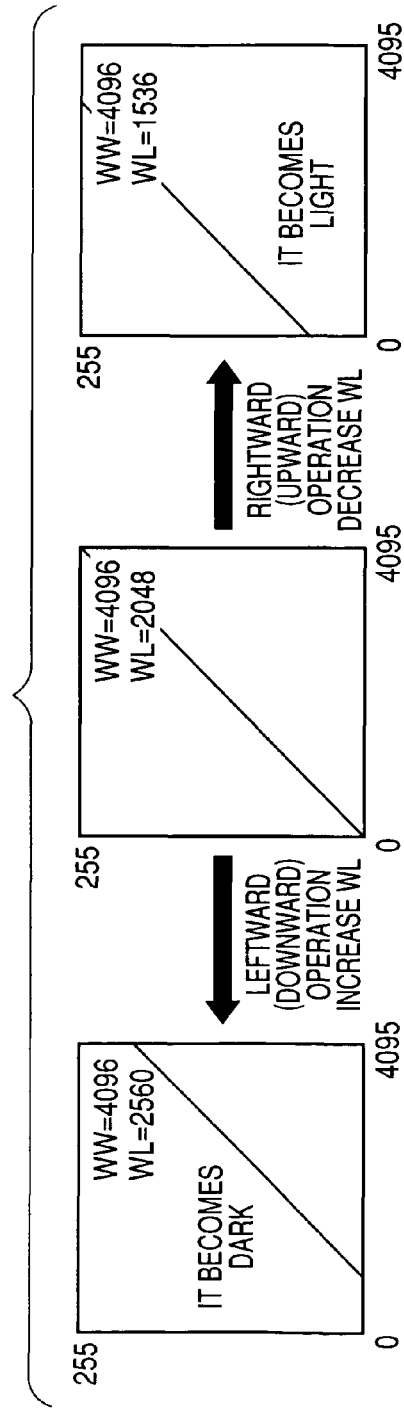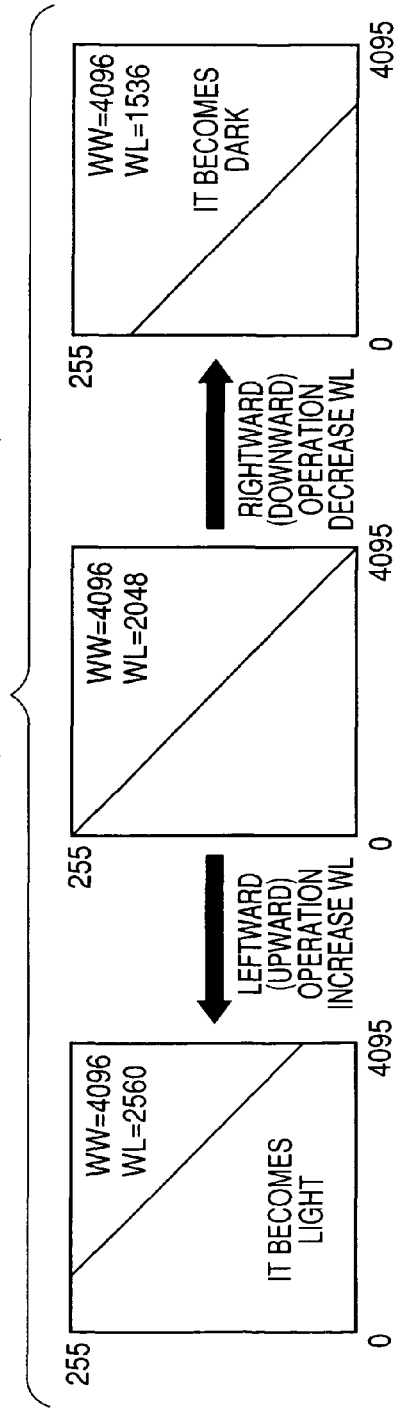

MONOCHROME 2

MONOCHROME 2 (GRAYSCALE INVERSION)

MONOCHROME 1

MONOCHROME 1 (GRAYSCALE INVERSION)

FIG. 15A
MONOCHROME 2
FIG. 15B
MONOCHROME 1
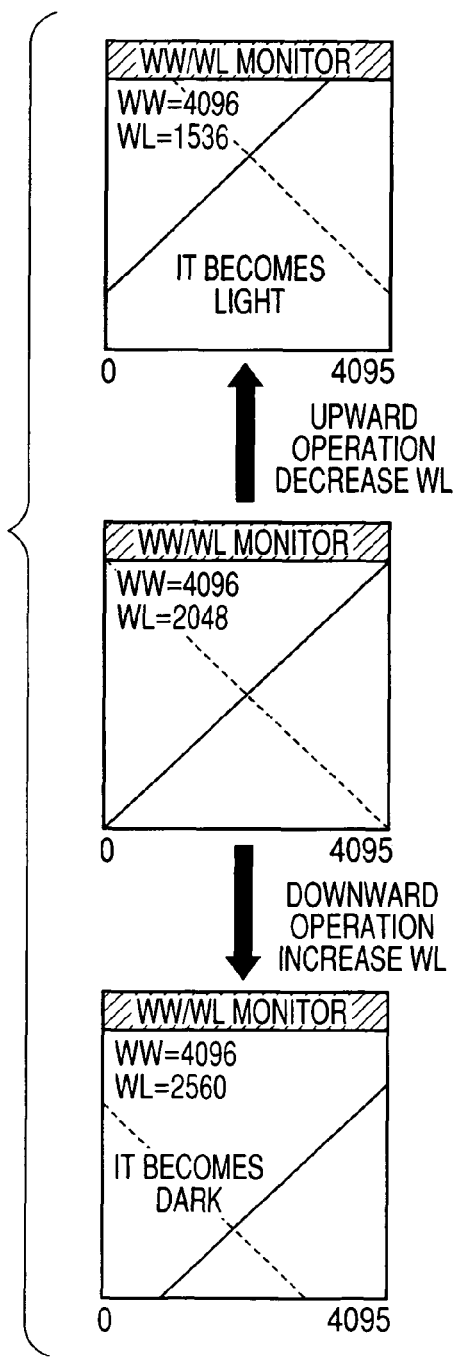
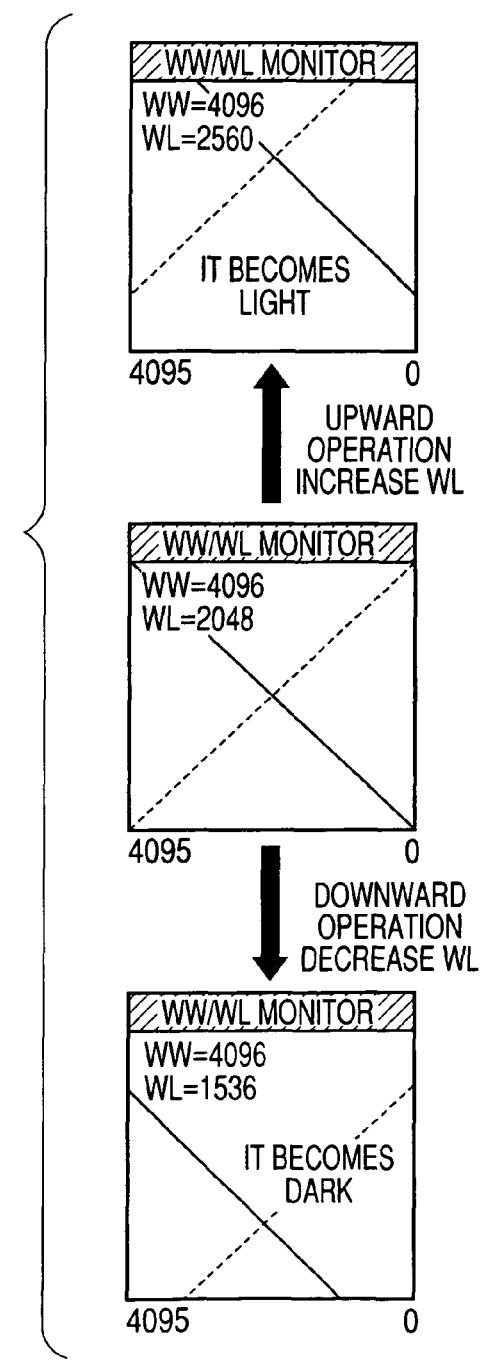

IMAGE PROCESSING DEVICE FOR PROCESSING IMAGE HAVING LUMINANCE INFORMATION, AND CONTROL METHOD THEREOF

BACKGROUND OF THE INVENTION

1. Field of the Invention

The present invention relates to an image processing device which processes a medical image and the like, a control method which is applied to the image processing device, and a control program which is used to execute the control method.

2. Related Background Art

Recently, the monitor diagnosis in which a medical image is used is widespread because of the advance of computer technology and the increase of memory storage capacity. More specifically, a radiographic image (X-ray image, gamma-ray image, or the like) radiographed or taken by modality (e.g., a radiation detector) is stored in a digital file, and the stored image is subjected to image processes such as a gradation transformation process, an enlargement/reduction process, an edge emphasis process and the like, whereby the processed image is displayed as the medical image on the monitor and thus used in the medical diagnosis.

Here, it should be noted that that the gradation transformation process includes a linear process and a non-linear process. That is, in the linear process, when the signal value in the image file taken by the modality is transformed into the output value to be displayed on the monitor, the range of the signal to be displayed is changed, and the contrast of the signal to be displayed is emphasized. Hereinafter, this process is called the operation of a lookup table. On the other hand, in the non-linear process, the gamma value is changed and sigmoid transformation is executed so as to approximately conform to the characteristic of the image output to a film.

Here, the operation of the lookup table will be explained with reference to FIGS. 16 and 17.

FIG. 16 is the graph showing the relation in case of transforming the value (input value) in the image file into the value (output value) to be displayed on the monitor, and FIG. 17 is the conceptual view showing a first example of the image display state in a case that the window values are changed.

Ordinarily, the dynamic range of the modality is larger than the dynamic range of the monitor. For this reason, the partial range in the digital image is often degenerated into the dynamic range of the monitor for medical image and displayed on this monitor. Here, it is assumed that the dynamic range of the image file is equivalent to 12 bits, and the dynamic range to be output to the monitor is equivalent to eight bits.

As shown in FIG. 16, the range in the input value to be used for the output value is the window width (WW), and the intermediate value of the window width is the window level (WL). Typically, as the initial value in case of first displaying the image, the window width (WW) is equivalent to the dynamic range of the modality (that is, $2^{12}=4096$ in case of 12 bits). Therefore, the window level (WL) is often set to be equivalent to the half of the WW (that is, $2^{11}=2048$) (1401 shown in FIG. 17). Incidentally, it is assumed that the line P shown in FIG. 16 is called the WW/WL line hereinafter.

As shown in FIG. 17, if the window level (WL) is decreased, the whole image becomes light (1402 shown in FIG. 17), and, if the window level (WL) is increased, the whole image becomes dark (1403 shown in FIG. 17). On the other hand, if the window width (WW) is increased, the whole image becomes soft by decreasing the contrast (1404 shown in FIG. 17), and, if the window width (WW) is decreased, the whole image becomes sharp (1405 shown in FIG. 17).

The document 1 (Japanese Patent Application Laid-Open No. 2002-333974) discloses the image processing device which sets the various image processing parameters including not only the window width (WW) and the window level (WL) but also the parameters to be used to execute the non-linear processes, by shifting the pointing device. In the document 1, the kind of parameter and the increase/decrease directions of the parameter value can be changed according to the designation by the user.

However, the radiographic image includes the image of which the input signal value "0" indicates white (hereinafter, called "image of monochrome 1" because its photometric interpretation value is defined as "monochrome 1" in the DICOM (Digital Imaging and Communication in Medicine) standard) and the image of which the input signal value "0" indicates black (hereinafter, called "image of monochrome 2" because its photometric interpretation value is defined as "monochrome 2" in the DICOM standard). Here, many image viewers corresponding to the DICOM standard display "image of monochrome 2" as it is and display "image of monochrome 1" in a grayscale inversion manner, whereby the input signal value "0" is displayed as black even if the photometric interpretation of the image is different.

Likewise, if the image viewers display "image of monochrome 1" as it is and display "image of monochrome 2" in a grayscale inversion manner, the input signal value "0" is displayed as white irrespective of the photometric interpretation of the image.

Here, it should be noted that whether the photometric interpretation of the medical image corresponds to "image of monochrome 1" or "image of monochrome 2" depends on the modality.

Incidentally, the plural modalities are mutually connected through the network, whereby various medical images are accumulated in the one PACS (Picture Archiving and Communication System). Thus, in the individual medical diagnosis scene, "image of monochrome 2" and "image of monochrome 1" often come to exist together.

FIG. 18 is a conceptual view showing a second example of the image display state in a case that the window values (WW, WL) of the grayscale inversed image are changed.

In case of displaying the grayscale inversed image, as indicated by numeral 1501 shown in FIG. 18, the image is acquired by up-and-down inverting the image 1401 shown in FIG. 17. For this reason, if the window level (WL) is decreased, the whole image becomes dark (1502 shown in FIG. 18). Moreover, if the window level (WL) is increased, the whole image becomes light (1503 shown in FIG. 18). Incidentally, as well as "image of monochrome 2", if the window width (WW) is increased, the whole image becomes soft by decreasing the contrast (1505 shown in FIG. 18), and, if the window width (WW) is decreased, the whole image becomes sharp (1504 shown in FIG. 18).

That is, in the ordinary display of "image of monochrome 2" and the ordinary display of "image of monochrome 1", as shown in FIG. 17, if the window width (WW) is fixed and the window level (WL) is decreased, the whole image becomes light, while if the window level (WL) is increased, the whole image becomes dark. On the contrary, in the grayscale inversed display of "image of monochrome 1" and the grayscale inversed display of "image of monochrome 2", as shown in FIG. 18, if the window width (WW) is fixed and the window level (WL) is decreased, the whole image becomes dark, while if the window level (WL) is increased, the whole image becomes light.

However, as described above, to display just the same the images of which the photometric interpretations are respectively different from each other, it is necessary to display one of these images in the grayscale inversion manner. That is, to display the input signal value "0" as black irrespective of the photometric interpretation of the image, "image of monochrome 2" is displayed ordinarily and "image of monochrome 1" is displayed in the grayscale inversion manner. Moreover, to display the input signal value "0" as white irrespective of the photometric interpretation of the image, "image of monochrome 2" is displayed in the grayscale inversion manner and "image of monochrome 1" is displayed ordinarily. For these reasons, even in a case where the appearances of the images to be displayed on the monitor are the same, if the window level (WL) of the image displayed ordinarily and the window level (WL) of the image displayed in the grayscale inversion manner are changed in the same manner, there is a problem that the brightness (lightness and darkness) of one image acquired in the image process becomes opposite to that of the other image. More specifically, the brightness of the image displayed ordinarily becomes opposite to the brightness of the image displayed in the grayscale inversion manner.

Therefore, in the case where a diagnostician who has plural modalities respectively having the different photometric interpretations changes the window level (WL) of the medical image, it is necessary for him/her to be conscious of the photometric interpretation of the image to which he/her intends to diagnose. For this reason, the diagnostician has to discriminatingly use the operation according to the photometric interpretation.

SUMMARY OF THE INVENTION

The present invention is completed in consideration of the above conventional problem, and an object thereof is to provide an image processing device by which a user can operate a window level value without being conscious of a photometric interpretation of the image, a control method of controlling the image processing device, and a control program corresponding to the control method.

To achieve the above object, an image processing device according to the present invention is characterized by comprising: an image input unit adapted to input an image; a photometric interpretation judgment unit adapted to judge photometric interpretation of the image input by the image input unit; a inversion judgment unit adapted to judge whether or not to inverse luminance of the input image, based on a judgment result by the photometric interpretation judgment unit; and a inversion unit adapted to, in a case where it is judged by the inversion judgment unit to inverse the luminance of the input image, inverse the luminance of the input image.

Moreover, an image processing device, according to the present invention, which changes a window level based on an operation at an operation unit is characterized by comprising: an image input unit adapted to input an image; a photometric interpretation judgment unit adapted to judge photometric interpretation of the image input by the image input unit; and a changing direction setting unit adapted to set the operation at the operation unit and a changing direction of the window level of the input image, according to the photometric interpretation of the image judged by the photometric interpretation judgment unit.

Moreover, an image processing method according to the present invention is characterized by comprising: an image input step of inputting an image; a photometric interpretation judgment step of judging photometric interpretation of the image input in the image input step; a inversion judgment step of judging whether or not to inverse luminance of the input image, based on a judgment result in the photometric interpretation judgment step; and a inversion step of, in a case where it is judged in the inversion judgment step to inverse the luminance of the input image, inversing the luminance of the input image.

Moreover, an image processing method, according to the present invention, which changes a window level based on an operation at an operation unit is characterized by comprising: an image input step of inputting an image; a photometric interpretation judgment step of judging photometric interpretation of the image input in the image input step; and a changing direction setting step of setting the operation at the operation unit and a changing direction of the window level of the input image, according to the photometric interpretation of the image judged in the photometric interpretation judgment step.

BRIEF DESCRIPTION OF THE DRAWINGS

FIGS. 3A and 3B are conceptual views showing the change of window values (WW: window width, WL: window level) in "image of monochrome 2" according to the first embodiment;

FIGS. 6A and 6B are conceptual views showing the change of window values in "image of monochrome 2" according to the second embodiment;

FIGS. 7A and 7B are conceptual views showing the change of window values in "image of monochrome 1" according to the second embodiment;

FIGS. 10A and 10B are conceptual views showing the change of window values in "image of monochrome 1" according to the third embodiment;

FIGS. 15A and 15B are conceptual views showing a vertical-direction operation for images ("image of monochrome 2" and "image of monochrome 1") displayed on the WW/WL monitor according to the fourth embodiment;

DETAILED DESCRIPTION OF THE PREFERRED EMBODIMENTS

Hereinafter, the embodiments of the present invention will be explained with reference to the attached drawings.

First Embodiment

Figure 1:
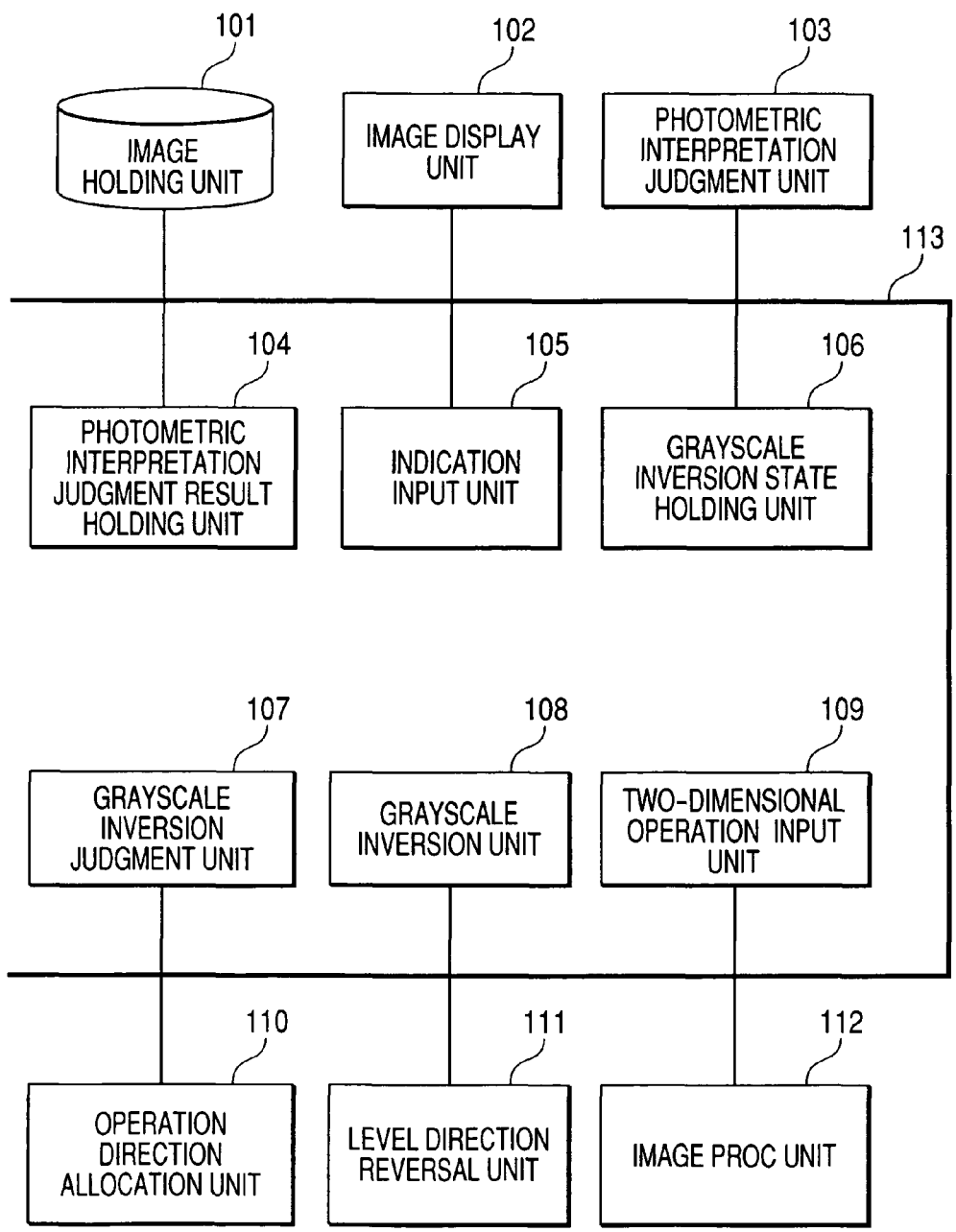
FIG. 1 is a block diagram showing the functional construction of a medical image processing device according to the first embodiment of the present invention.

FIG. 1 is a block diagram showing the functional construction of a medical image processing device according to the first embodiment of the present invention.

Respective functional devices to be explained below are connected to the medical image processing device through a bus 113.

In FIG. 1, numeral 101 denotes an image holding unit which reads a file of including medical images radiographed by the modality and holds a portion of the medical images as input images. Numeral 102 denotes an image display unit which displays the input images held in the image holding unit 101 and an image processing result of the input image.

Numeral 103 denotes a photometric interpretation judgment unit which judges the photometric interpretation if the input image is an image of expressing black as data of "0" or an image of expressing white as data of "0". Numeral 104 denotes a photometric interpretation judgment result holding unit which holds a judgment result of the photometric interpretation, which was judged in the photometric interpretation judgment unit 103.

Numeral 105 denotes an indication input unit, by which a user inputs an indication of grayscale inversion of a display image to be displayed on the image display unit 102. Numeral 106 denotes a grayscale inversion state holding unit which holds a state of the grayscale inversion indication, which was input from the indication input unit 105.

Numeral 107 denotes a grayscale inversion judgment unit which judges whether or not an output value, which is used for displaying the input image on the image display unit 102, is actually inversed based from the judgment result held in the photometric interpretation judgment result holding unit 104 and the grayscale inversion state held in the grayscale inversion state holding unit 106. Numeral 108 denotes a grayscale inversion unit which inverses the output value of the input image to be displayed on the image display unit 102 in a case that it was determined that the grayscale inversion is executed in the grayscale inversion judgment unit 107.

Numeral 109 denotes a two-dimensional operation input unit like a pointing device such as a mouse or arrow keys on a keyboard. Numeral 110 denotes an operation direction allocation unit which previously allocates an operation of the right-and-left direction executed by the two-dimensional operation input unit 109 for an operation of changing the one of a window width (WW) or a window level (WL) and an operation of the vertical direction executed by the two-dimensional operation input unit 109 for an operation of changing the other of the window width (WW) or the window level (WL).and holds these operations.

Numeral 111 denotes a level direction reversal unit which reverses the direction of changing the window level in accordance with the grayscale inversion judgment result judged in the grayscale inversion judgment unit 107. Numeral 112 denotes an image processing unit which executes an image process of changing window values for the input image based from the window width and the window level operated from the two-dimensional operation input unit 109.

Next, a basic operation, by which a UI (user interface) operation for "image of monochrome 1" is coincided with a UI operation for "image of monochrome 2", will be explained with reference to FIG. 2.

Figure 2:
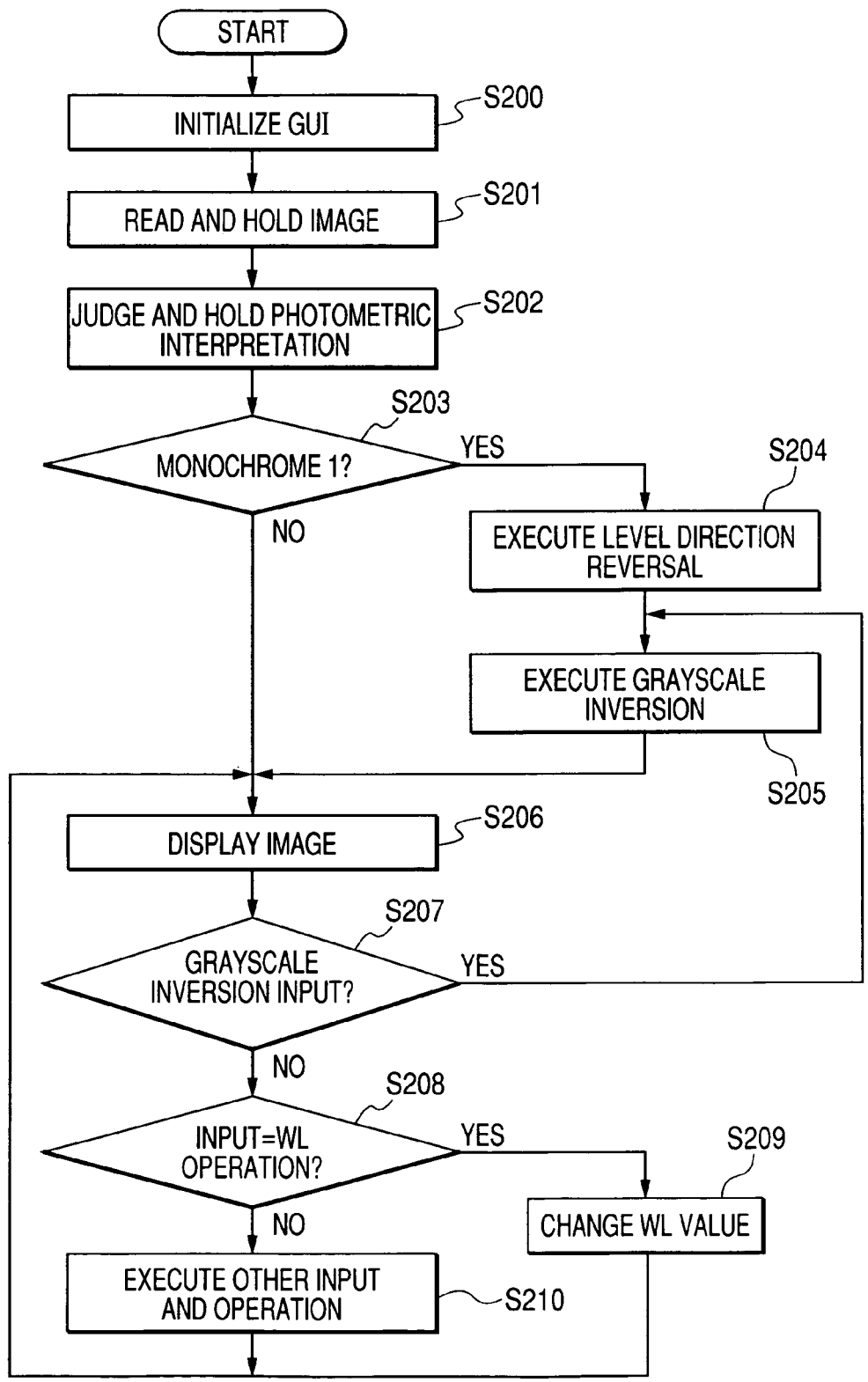
FIG. 2 is a flowchart showing operations of the first embodiment.

FIG. 2 is a flowchart showing operations of the first embodiment.

Initially, in a step S200, an initializing process of a GUI (graphical user interface) is executed. In this initializing process, an initial value of the operation direction in the UI operation is stored in the operation direction allocation unit 110, and an initial value of the grayscale inversion state is stored in the grayscale inversion state holding unit 106. The initial values to be set in the step S200 are set so as to decrease the window level (WL) by a leftward (or downward) operation of the two-dimensional operation input unit 109 and increase the window level (WL) by a rightward (or upward) operation of the two-dimensional operation input unit 109. With respect, to this GUI initializing process, it may be a state that a hard-coding is affected in a program, or it may be read from a user setting file separately prepared, or it may be indicatively input by a user using the UI.

Next, in a step S201, an image reading/holding process is executed by reading a file of including medical images and holding a portion of the medical images in the image holding unit 101 as the input images. With respect to a reading method of the medical images, medical images radiographed in the modality connected to a network may be received on the basis of a standard such as the DICOM transfer, or medical images, which are based on the DICOM standard or the like and stored in a local machine, a referential common file of another machine or the like, may be directly read.

In a subsequent step S202, a judgment of photometric interpretation for judging if the input image read and held in the image holding unit 101 is an image of expressing black as data of "0" or an image of expressing white as data of "0", is executed in the photometric interpretation judgment unit 103, and the judgment result is held in the photometric interpretation judgment result holding unit 104. With respect to a judging method of the photometric interpretation, it may be judged by referring to a tag value of "Photometric Interpretation" based on the DICOM standard in a case that an image held in the image holding unit 101 is a file of the DICOM standard or a user may select an image by displaying the image on the image display unit 102 without processing the input image.

Then, in a step S203, when the judgment result held in the photometric interpretation judgment result holding unit 104 indicates "monochrome 1", that is, it indicates "image of monochrome 1", a flow shifts to a step S204, and when the judgment result does not indicate "monochrome 1", that is, it does not indicate "image of monochrome 1", the flow shifts to a step S206.

In the step S204, a level direction reversal process for reversing the direction, which is increased or decreased by the UI, of the window level (WL) previously held in the operation direction allocation unit 110 is executed in the level direction reversal unit 111, then the flow shifts to a step S205. In the step S205, a grayscale inversion process of a display image held in the image holding unit 101 is executed in the grayscale inversion unit 108, and the grayscale inversion state held in the grayscale inversion state holding unit 106 is inversed, then the flow shifts to the step S206.

In the step S206, the image held in the image holding unit 101 is displayed on the image display unit 102 and then it is shifted to a state of waiting an input. In a next step S207, when an input from a user is a grayscale inversion input, the flow returns to the step S205, and when the input from the user is not the grayscale inversion input, the flow shifts to a step S208.

In the step S208, when an input from the user is an input of a window level (WL) operation, the flow shifts to a step S209, and when it is a case other than the above case, the flow shifts to a step S210. In the step S209, a window level (WL) value is changed referring to the contents of the operation direction allocation unit 110 in accordance with an operation of the window level (WL) which was input from the two-dimensional operation input unit 109 in the image processing unit 112, and the flow returns to the step S206.

In the step S210, other input and operation such as a zooming process, a panning process, an operation of changing the window width (WW) and the like are executed, and the flow returned to the step S206.

In this manner, in the present embodiment, the operation direction of the window level (WL) is reversed immediately after reading the image for "image of monochrome 1" and further the grayscale inversion process is executed. Thereby, as shown in FIGS. 3A, 3B, 4A and 4B, the operation direction of the window level (WL) is reversed between "image of monochrome 1" and "image of monochrome 2". Accordingly, in images, which are looked by a user, having the same appearance, that is, in an image of ordinary display of "image of monochrome 2" (FIG. 3A) and an image of the grayscale inversion display of "image of monochrome 1" (FIG. 4B), or in an image of the grayscale inversion display of "image of monochrome 2" (FIG. 3B) and an image of ordinary display of "image of monochrome 1" (FIG. 4A), when the window level (WL) is changed by an operation of the same direction, brightness (lightness and darkness) of an image obtained by executing an image process can be also similarly changed.

Figure 4A:
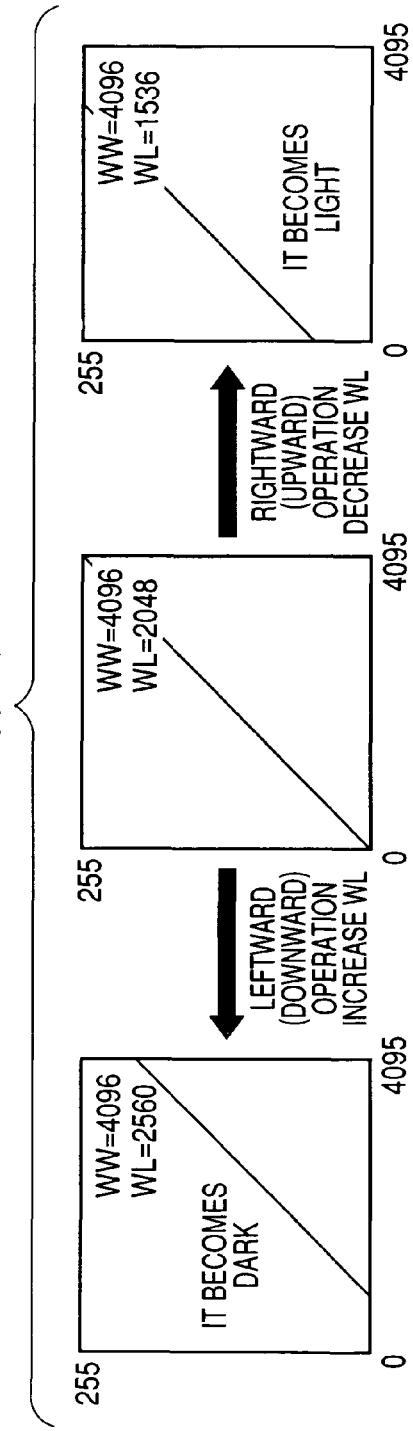
FIGS. 4A and 4B are conceptual views showing the change of window values in "image of monochrome 1" according to the first embodiment.
Figure 4B:
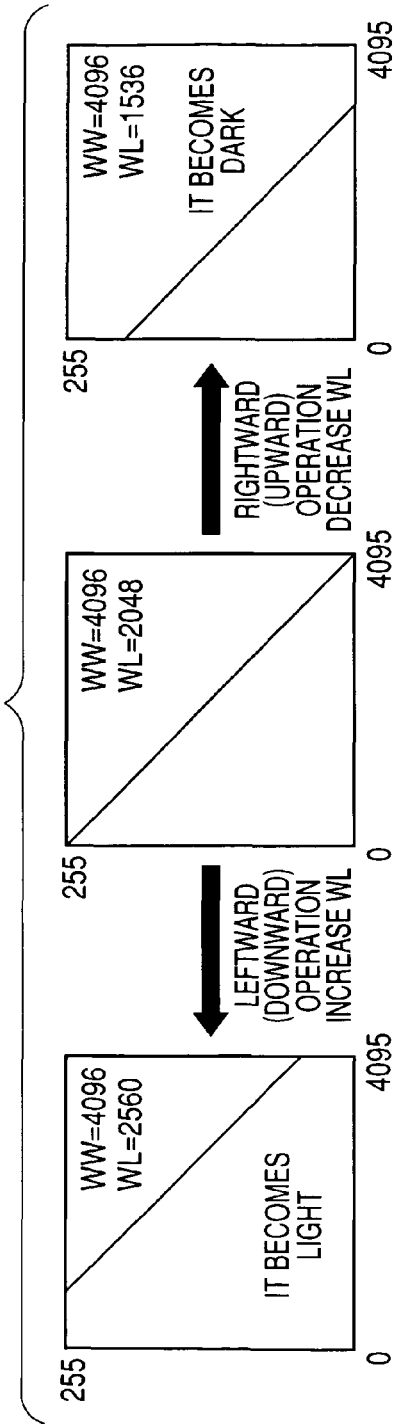

FIGS. 3A and 3B are conceptual views showing the change of window values in "image of monochrome 2" according to the first embodiment, and FIG. 3A is concerned with the ordinary display occasion and FIG. 3B is concerned with the grayscale inversion display occasion. FIGS. 4A and 4B are conceptual views showing the change of window values in "image of monochrome 1" according to the first embodiment, and FIG. 4A is concerned with the ordinary display occasion and FIG. 4B is concerned with the grayscale inversion display occasion.

Second Embodiment

In the above-mentioned first embodiment, in case of changing the window level (WL) by an operation of the same direction only for images, which are looked by a user, having the same appearance, the brightness of an image obtained by an image process was to be also similarly changed. However, in the present embodiment, regardless of "image of monochrome 2" and "image of monochrome 1" or the ordinary display/grayscale inversion display of these images, in case of changing the window level (WL) by the operation of the same direction, the brightness (lightness and darkness) of an image obtained by an image process is to be also similarly changed.

Figure 5:
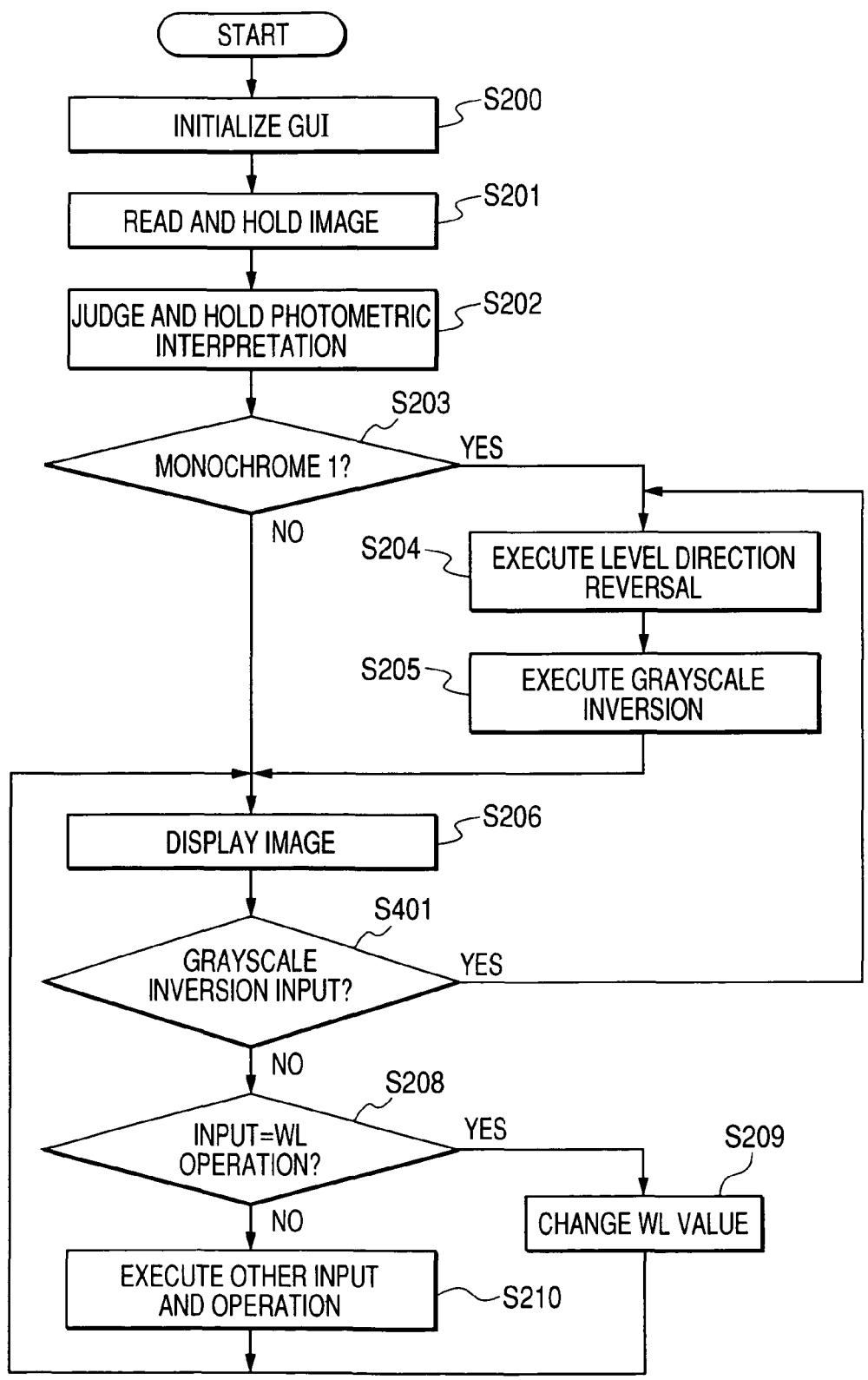
FIG. 5 is a flowchart showing operations of the second embodiment.

FIG. 5 is a flowchart showing operations of the second embodiment. In FIG. 5, the same factors as those in FIG. 2 are denoted by the same numerals and the explanation thereof will be omitted.

In the present embodiment, in a step S401 after a process in the step S206, when an input at a side of a user is a grayscale inversion input, a flow shifts to the step S204, and when the input at a side of the user is not the grayscale inversion input, the flow shifts to the step S208. This point mentioned in the above is different from a case of the first embodiment explained in FIG. 2, and other processes are similarly executed as those in the first embodiment.

FIGS. 6A and 6B are conceptual views showing the change of window values in "image of monochrome 2" according to the second embodiment, and FIG. 6A is concerned with the ordinary display occasion and FIG. 6B is concerned with the grayscale inversion display occasion. FIGS. 7A and 7B are conceptual views showing the change of window values in "image of monochrome 1" according to the second embodiment, and FIG. 7A is concerned with the ordinary display occasion and FIG. 7B is concerned with the grayscale inversion display occasion.

According to the present embodiment, as shown in FIGS. 6A, 6B, 7A and 7B, even if an image is any of "image of monochrome 2" or "image of monochrome 1" and regardless of the ordinary display or the grayscale inversion display of these images, an entire image becomes light by an upward (or leftward) operation and becomes dark by a downward (or rightward) operation for all images. Likewise, it becomes possible to realize a UI, by which the change of brightness in an image is coincided with an operation direction of the two-dimensional operation input unit 109.

Therefore, in an image viewer for displaying medical images under the condition that images, which are radiographed by various modalities and different in the photometric interpretation are existing with a mixed state, it becomes possible that a user can change window values without feeling that if an input image is an image of expressing black as data of "0" or an image of expressing white as data of "0".

Third Embodiment

In the third embodiment, it is controlled that the first embodiment is adopted in a case that the operation direction of the two-dimensional operation input unit 109 is the right-and-left direction when the window level (WL) is changed and the second embodiment is adopted in a case that the operation direction of the two-dimensional operation input unit 109 is the vertical direction when the window level (WL) is changed.

Figure 8:
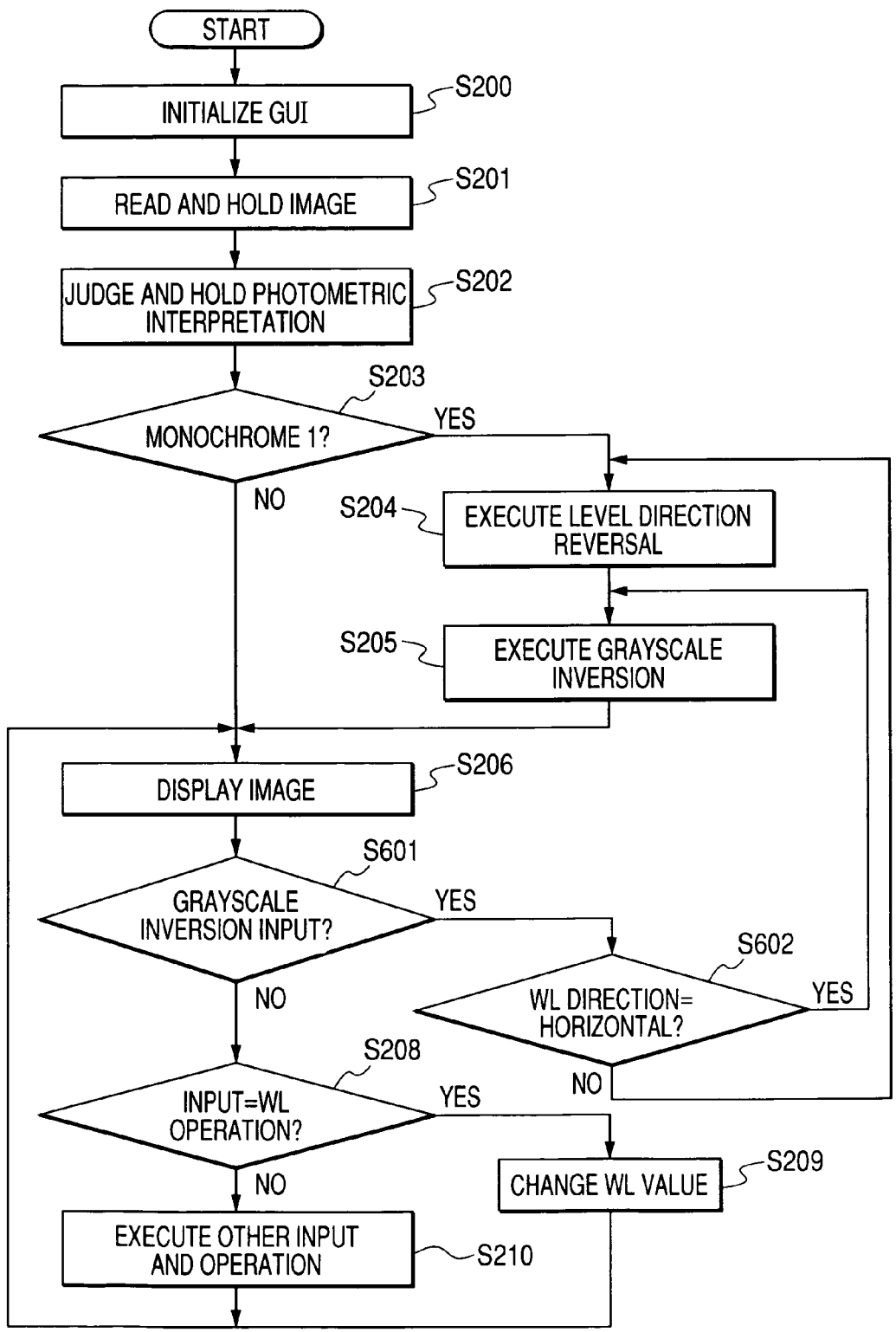
FIG. 8 is a flowchart showing operations of the third embodiment.

FIG. 8 is a flowchart showing operations of the third embodiment. In FIG. 8, the same factors as those in FIG. 2 are denoted by the same numerals and the explanation thereof will be omitted.

In the present embodiment, when it is judged that an input from a user is a grayscale inversion input in a grayscale inversion input judgment process (step S601) after the process in the step S206, a flow shifts to a step S602, and when it is judged that the input from the user is not the grayscale inversion input, the flow shifts to the step S208. In the step S602, when the operation direction of the window level (WL) of a GUI is the right-and-left direction (horizontal direction), the flow shifts to the step S205, and when the operation direction is not the right-and-left direction, that is, it is the upper-and-lower direction (vertical direction), the flow shifts to the step S204, where a level direction reversal process of the window level (WL) is executed.

Figure 9A:
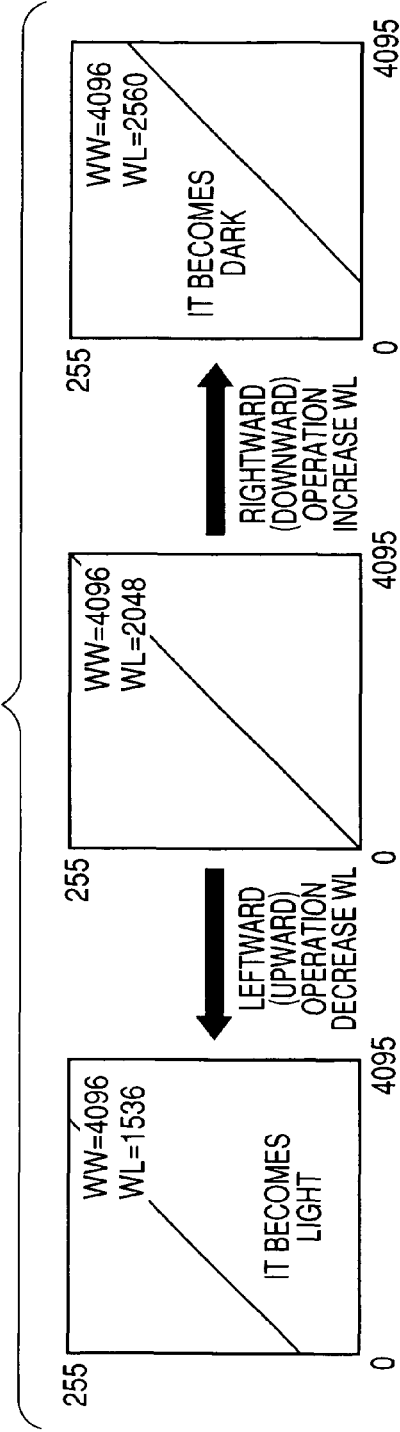
FIGS. 9A and 9B are conceptual views showing the change of window values in "image of monochrome 2" according to the third embodiment.
Figure 9B:
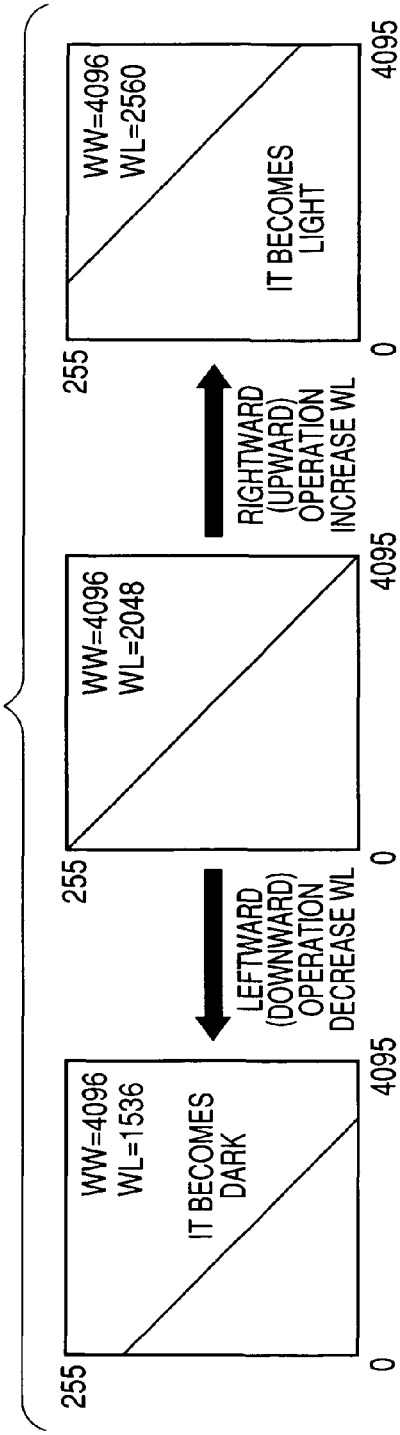

FIGS. 9A and 9B are conceptual views showing the change of window values in "image of monochrome 2" according to the third embodiment, and FIG. 9A is concerned with the ordinary display occasion and FIG. 9B is concerned with the grayscale inversion display occasion. FIGS. 10A and 10B are conceptual views showing the change of window values in "image of monochrome 1" according to the third embodiment, and FIG. 10A is concerned with the ordinary display occasion and FIG. 10B is concerned with the grayscale inversion display occasion.

In the present embodiment, as shown in FIGS. 9A, 9B, 10A and 10B, in the ordinary display of "image of monochrome 2" and the grayscale inversion display of "image of monochrome 1", if the direction of changing the window level (WL) is the left-direction, an entire image becomes light in the left-direction. And, in the grayscale inversion display of "image of monochrome 2" and the ordinary display of "image of monochrome 1", the entire image becomes dark in the left-direction.

On the other hand, in the ordinary display of "image of monochrome 2", if the entire image becomes light when the direction of changing the window level (WL) is the upper-direction, the entire image becomes light in the upper-direction for all images even if an image is any of "image of monochrome 2" and "image of monochrome 1", and even if the respective images are images of the grayscale display.

Fourth Embodiment

Figure 16:
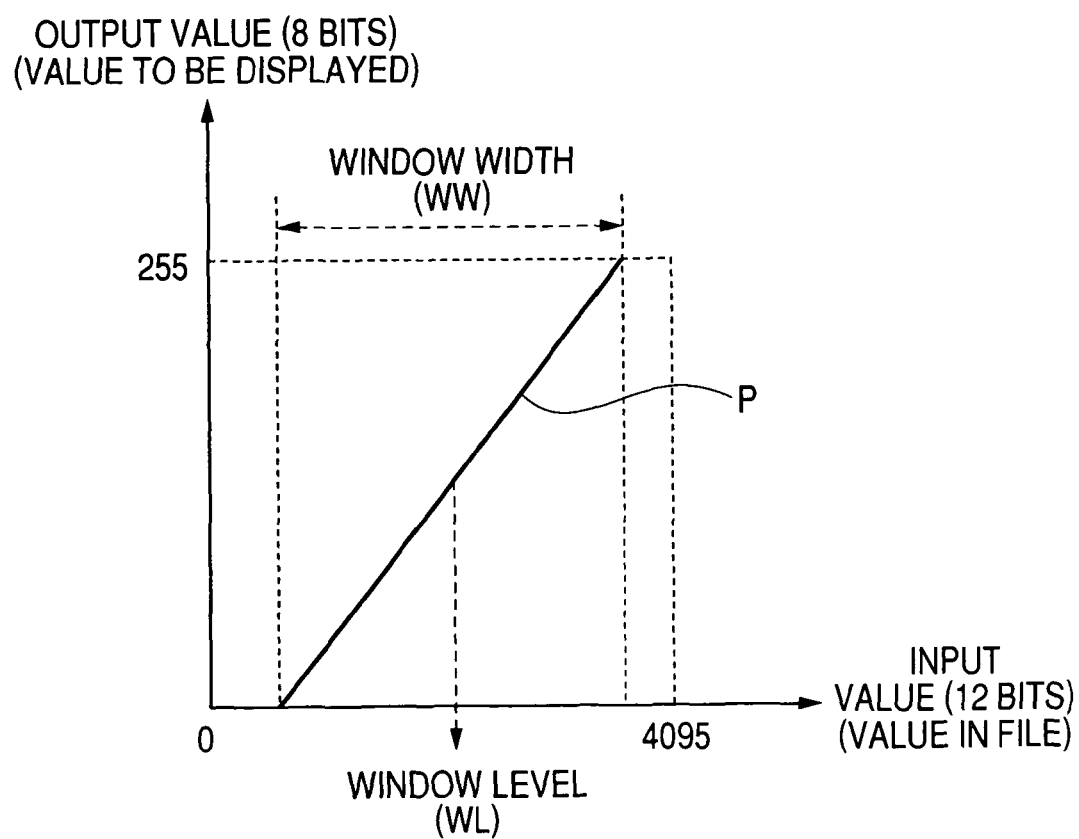
FIG. 16 is the graph showing the relation in case of transforming the value (input value) in the image file into the value (output value) to be displayed on the monitor.
Figure 17:
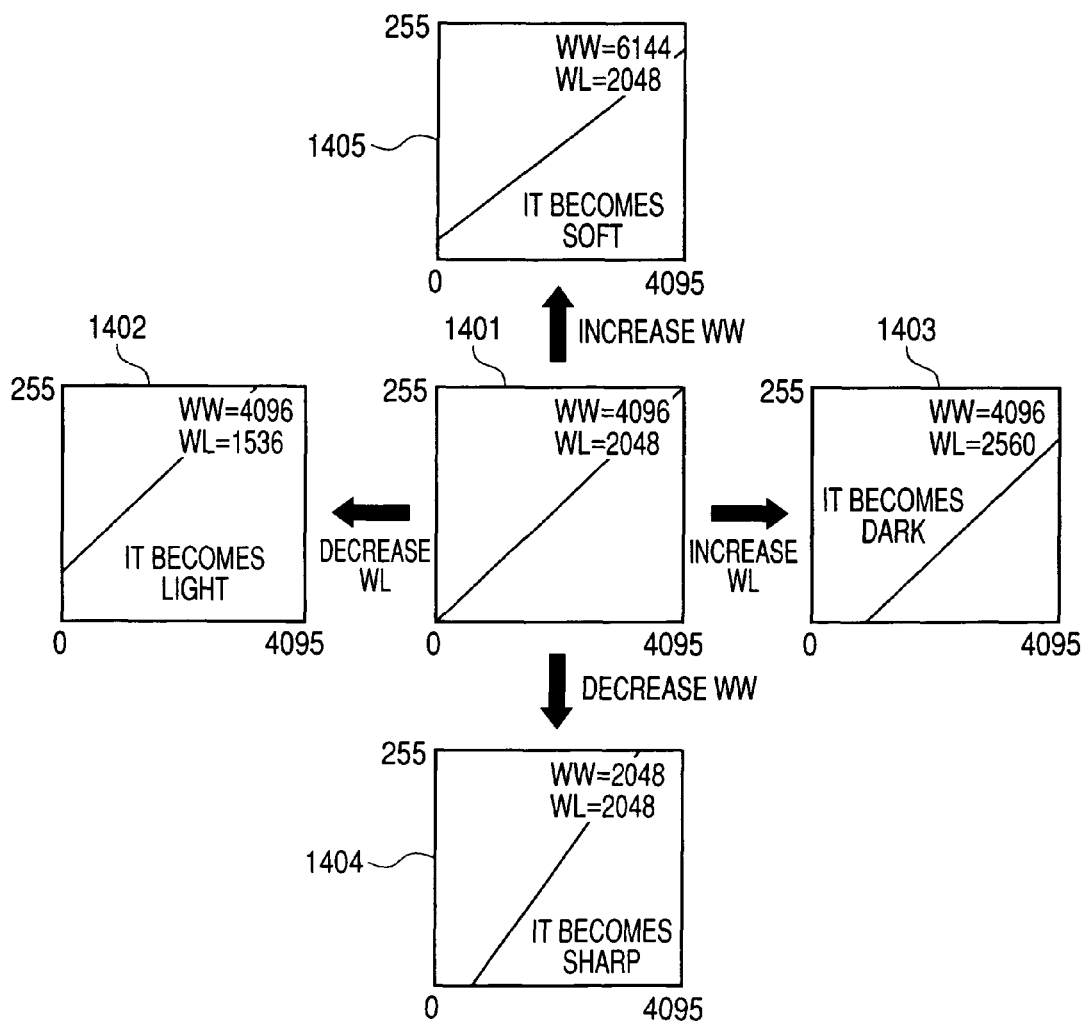
FIG. 17 is a conceptual view showing a first example of the image display state in a case that the window values are changed.
Figure 18:
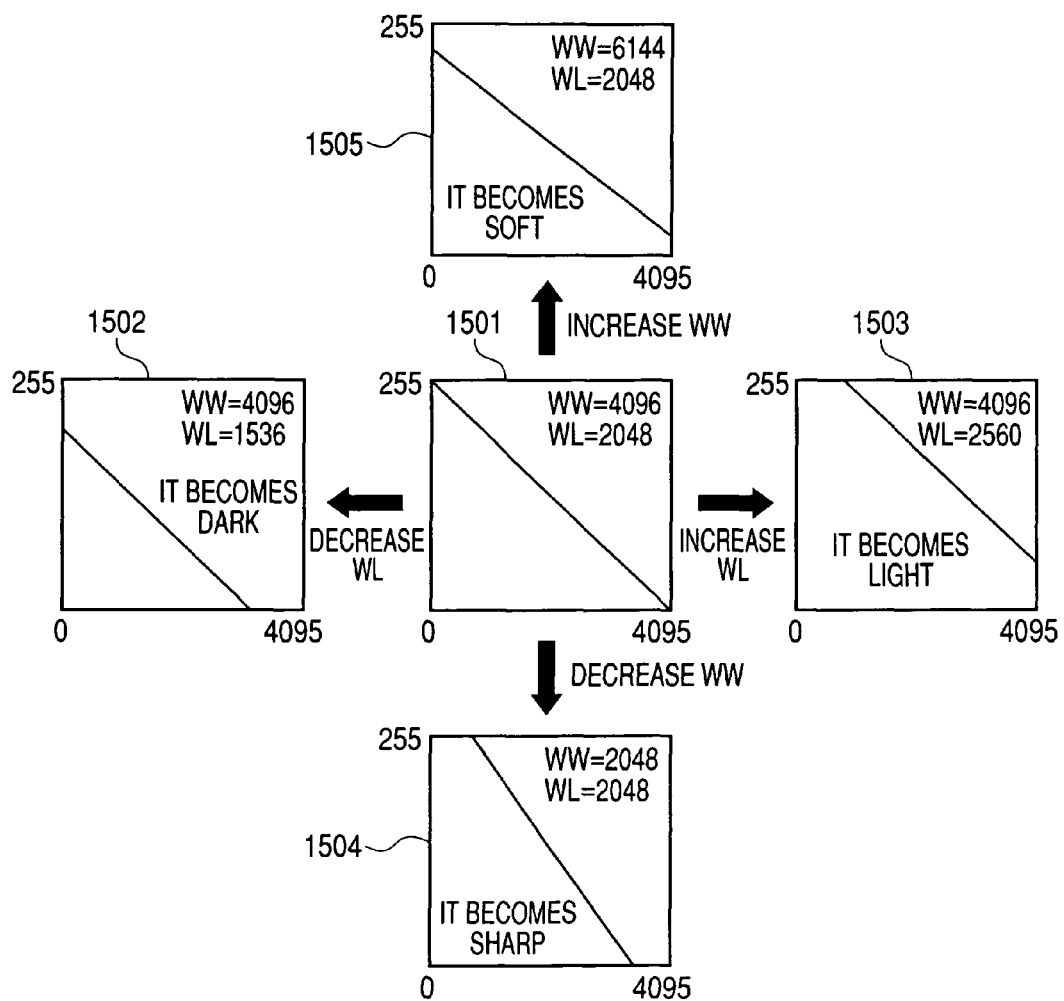
FIG. 18 is a conceptual view showing a second example of the image display state in a case that the window values are changed.

An image processing device having a GUI (hereinafter, called a WW/WL monitor) for displaying window width (WW) and window level (WL) as shown in FIG. 16 on an independent small window or a part of an image display unit has been already known. However, in the conventional WW/WL monitor, it is general that an origin of coordinate axes (input and output values are equal to zero) is assumed to be located on a lower left portion and input values are fixed on an X-axis and output values are fixed on a Y-axis.

When images according to the first, second and third embodiments are displayed on the conventional WW/WL monitor, as to "image of monochrome 2", the GUI operation direction which was input from the two-dimensional operation input unit 109 coincides with the moving direction of a WW/WL straight line to be displayed on the WW/WL monitor as shown in FIGS. 3 and 4, FIGS. 6 and 7, and FIGS. 9 and 10 in a case that the direction of a UI operation of the window level (WL) is the horizontal direction (the right-and-left direction). However, as to "image of monochrome 1", the GUI operation direction which was input from the two-dimensional operation input unit 109 becomes opposite to the moving direction of the WW/WL straight line to be displayed on the WW/WL monitor.

Figure 11:
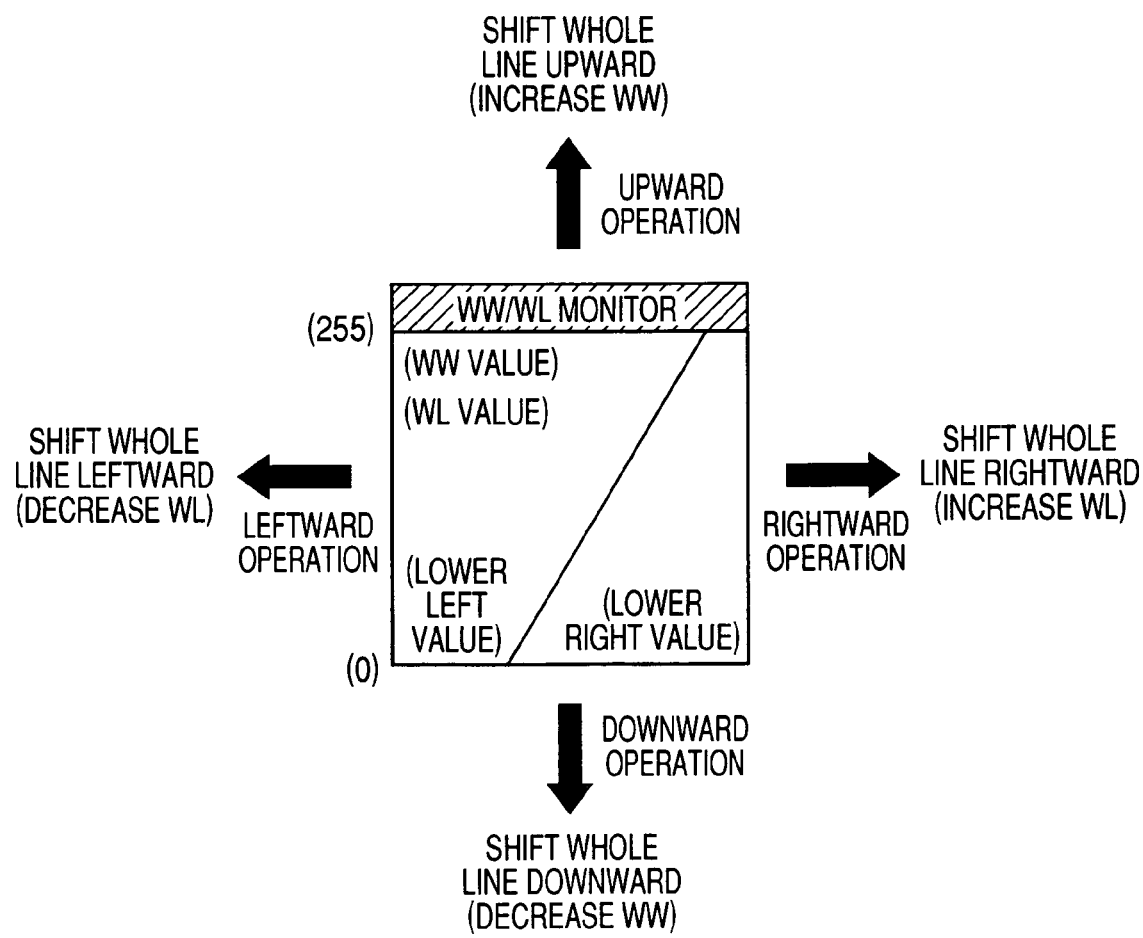
FIG. 11 is a view showing a WW (window width)/WL (window level) monitor and an operating state of the WW/WL monitor.

Therefore, as shown in FIG. 11, a lower left value and a lower right value of input values are respectively displayed on a lower left portion and a lower right portion in the WW/WL monitor, and in case of "image of monochrome 1", the right-to-left reversal process is executed. FIG. 11 is a view showing the WW/WL monitor and an operating state of the WW/WL monitor.

A process for realizing that operation will be explained with reference to FIG. 12.

Figure 12:
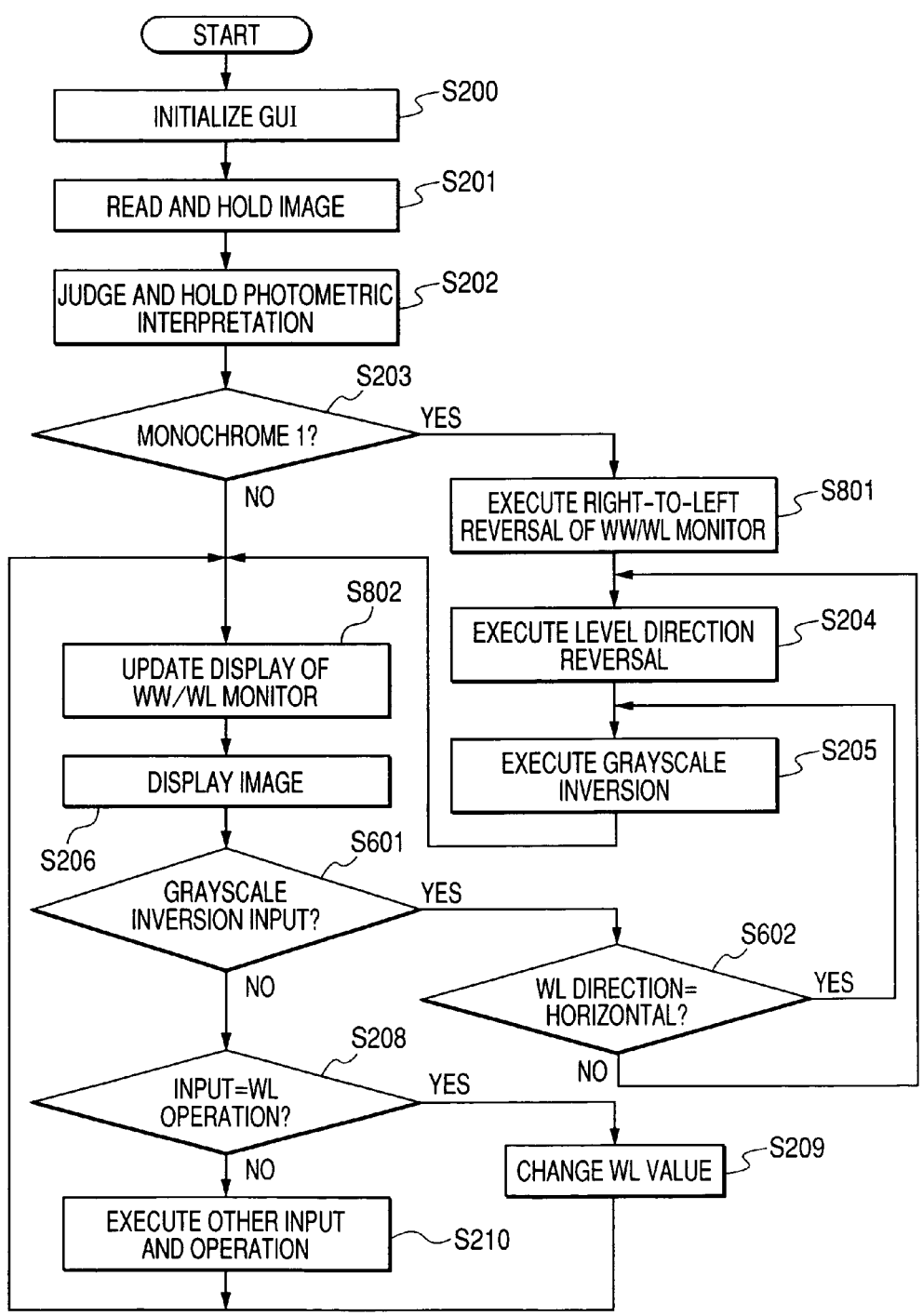
FIG. 12 is a flowchart showing operations of the fourth embodiment.

FIG. 12 is a flowchart showing operations of the fourth embodiment. In FIG. 12, the same factors as those in FIG. 8 are denoted by the same numerals and the explanation thereof will be omitted.

In the present embodiment, when the photometric interpretation in a step S203 indicates "monochrome 1", that is, it indicates "image of monochrome 1", a flow advances to a step S801. In the step S801, a right-to-left reversal process of the WW/WL monitor is executed by replacing the lower right value by the lower left value to be displayed on the WW/WL monitor and also executing the right-to-left reversal process to the WW/WL straight line to be displayed, then the flow shifts to the step S204.

When the photometric interpretation does not indicate "monochrome 1", that is, it does not indicate "image of monochrome 1", the flow advances to a step S802. In the step S802, a display/update process of the WW/WL monitor is executed. Then the flow shifts to the step S206.

In this manner, according to the present embodiment, in a case that the photometric interpretation indicates "monochrome 1", that is, it indicates "image of monochrome 1", by reversing the display direction of the WW/WL monitor to the horizontal direction (the right-and-left direction), the operation direction of the two-dimensional operation input unit 109 coincides with the moving direction of the WW/WL straight line to be displayed on the WW/WL monitor in a case that the window level (WL) is operated in the horizontal direction by the two-dimensional operation input unit 109 as shown in FIGS. 13A, 13B, 14A and 14B. Thereby, a more usable UI is realized.

Figure 13A:
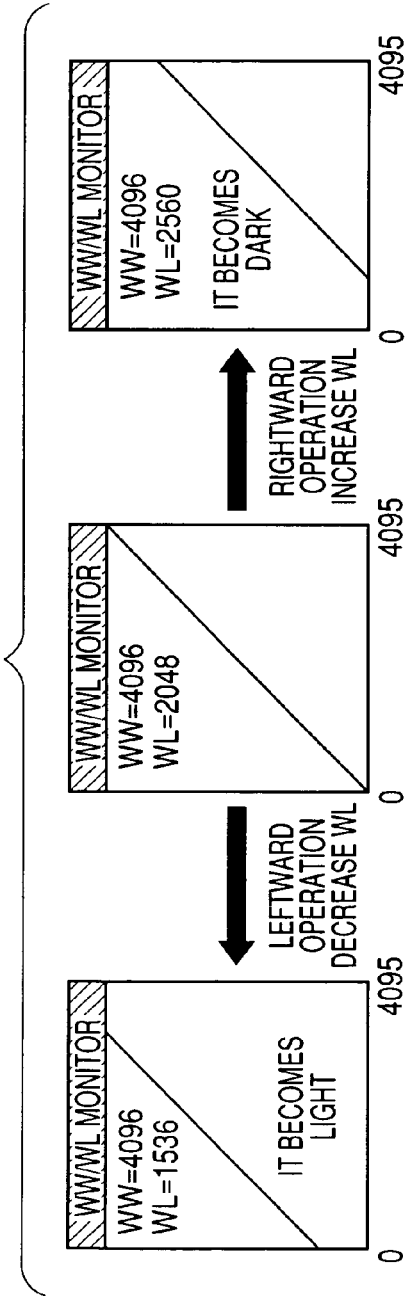
FIGS. 13A and 13B are conceptual views showing a horizontal-direction operation for "image of monochrome 2" displayed on the WW/WL monitor according to the fourth embodiment.
Figure 13B:
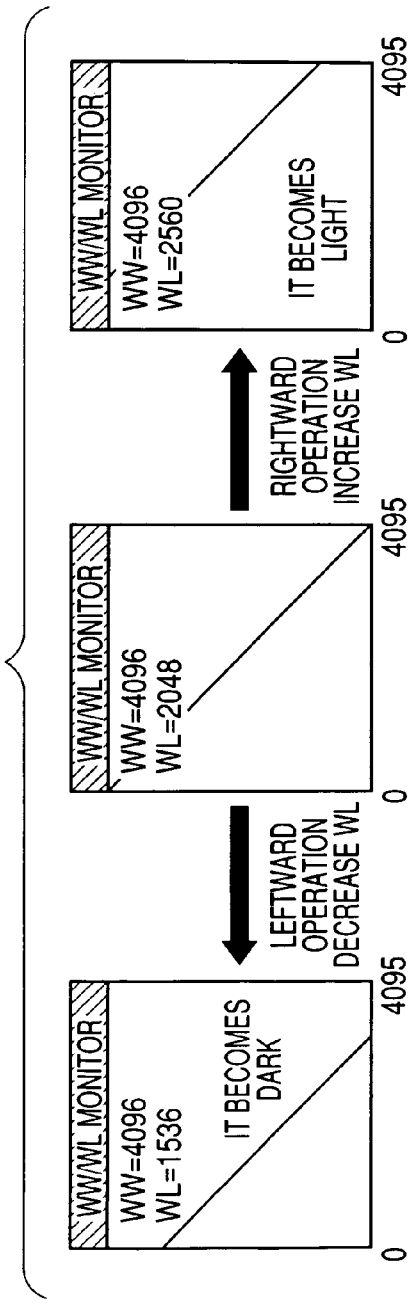
Figure 14A:
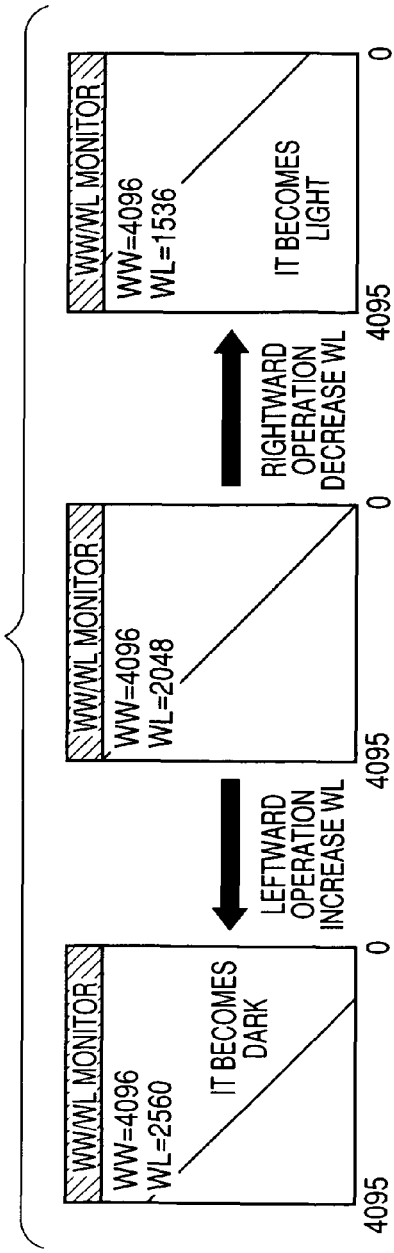
FIGS. 14A and 14B are conceptual views showing a horizontal-direction operation for "image of monochrome 1" displayed on the WW/WL monitor according to the fourth embodiment.
Figure 14B:
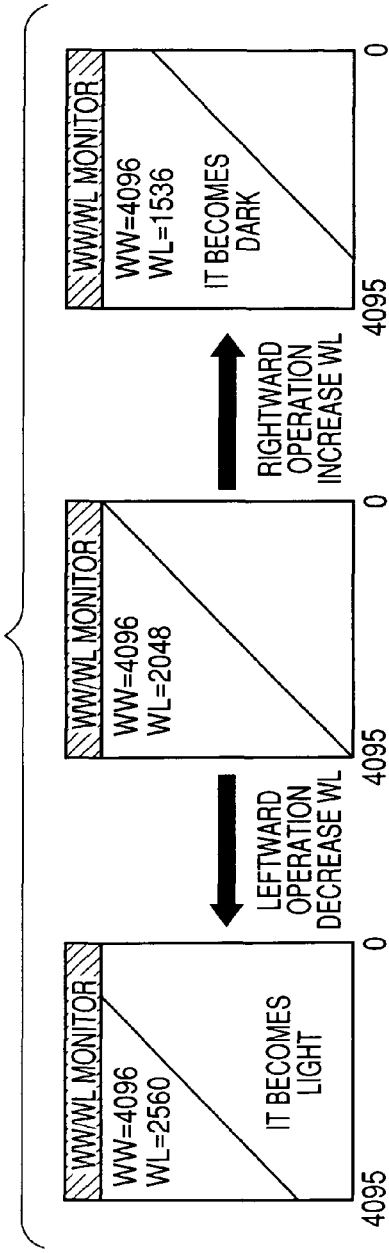

FIGS. 13A and 13B are conceptual views showing a horizontal-direction operation for "image of monochrome 2" displayed on the WW/WL monitor according to the fourth embodiment, and FIG. 13A is concerned with the ordinary display occasion and FIG. 13B is concerned with the grayscale inversion display occasion. FIGS. 14A and 14B are conceptual views showing a horizontal-direction operation for "image of monochrome 1" displayed on the WW/WL monitor according to the fourth embodiment, and FIG. 14A is concerned with the ordinary display occasion and FIG. 14B is concerned with the grayscale inversion display occasion.

Also in a case that the window level (WL) is operated in the vertical direction by the two-dimensional operation input unit 109, the operation direction of the two-dimensional operation input unit 109 coincides with the moving direction of the WW/WL straight line to be displayed on the WW/WL monitor as shown in FIGS. 15A and 15B. FIGS. 15A and 15B are conceptual views showing a vertical-direction operation for the images displayed on the WW/WL monitor according to the fourth embodiment, and FIG. 15A indicates a case of "image of monochrome 2" and FIG. 15B indicates a case of "image of monochrome 1". Broken lines shown in FIGS. 15A and 15B indicate the WW/WL straight lines at a time of the grayscale inversion.

The present invention is not limited to the device of the above-mentioned embodiments, but may be adopted to a system composed of plural devices or to a device including single equipment. It is needless to say that an object of the present invention can be achieved in a case where a storage medium storing the program codes of software for realizing the functions of the above-mentioned embodiments is supplied to a system or a device and then a computer (or CPU or MPU) in the system or the device reads and executes the program codes stored in the storage medium.

In this case, the program codes themselves read from the storage medium realize the functions of the above-mentioned embodiments, and the storage medium storing such the program codes constitutes the present invention. As the storage medium for supplying the program codes, for example, a floppy (registered trademark) disk, a hard disk, an optical disk, a magnetooptical disk, a CD-ROM, a CD-R, a magnetic tape, a nonvolatile memory card, a nonvolatile memory or the like can be used. It is needless to say that the present invention also includes not only a case where the functions of the above-mentioned embodiments are realized by the execution of the program codes read by the computer, but also a case where an OS (operating system) or the like functioning on the computer executes all the process or a part thereof according to the instructions of the program codes, thereby realizing the functions of the above-mentioned embodiments.

Further, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above-mentioned embodiments.

This application claims priority from Japanese Patent Application No. 2004-280438 filed on Sep. 27, 2004, which is hereby incorporated by reference herein.

What is claimed is:

1. An image processing device which changes a window level of an image associated with a range of an input pixel value of the image for an output pixel value on a display unit based on an operation by a user using an operation unit, comprising:
   an image input unit adapted to input the image;
   a photometric interpretation judgment unit adapted to judge a definition of a photometric interpretation of the input image by which a changing direction of the window level is determined; and
   a changing direction setting unit adapted to reverse the changing direction of the window level to the predetermined operation of the user using the operation unit, according to whether the definition of the photometric interpretation of the input image indicates to display an input signal value "0" as black or white, on the basis of the judgment of the photometric interpretation judgment unit.

2. An image processing device according to claim 1, further comprising:
   a grayscale inversion indication unit adapted to indicate a grayscale inversion process to the image; and
   a changing direction reversal unit adapted to, according to presence/absence of the indication by said grayscale inversion indication unit, reverse the changing direction of the window level set by said changing direction setting unit.

3. An image processing device according to claim 1, further comprising a display control unit adapted to display a window width and the window level on a display device, as setting input values on the lateral axis and output values on the longitudinal axis,
   wherein said display control unit sets the direction of the lateral axis based on the changing direction of the window level set by said first changing direction setting unit or said second changing direction setting unit.

4. An image processing method which changes a window level of an image associated with a range of an input pixel value of the image for an output pixel value on a display unit based on an operation at an operation unit, comprising:
   an image input step of inputting an image using an image processor;
   a photometric interpretation judgment step of judging, using the image processor, a definition of a photometric interpretation of the input image by which a changing direction of the window level is determined; and
   a changing direction setting step of reversing the changing direction of the window level to the predetermined operation of the user using the operation unit, according to whether the definition of the photometric interpretation of the input image indicates to display an input signal value "0" as black or white, on the basis of the judgment of the photometric interpretation judgment step.

5. An image processing method according to claim 4, further comprising:
   a grayscale inversion indication step of indicating a grayscale inversion process to the image; and
   a changing direction reversal step of, according to presence/absence of the indication in said grayscale inversion indication step, reversing the changing direction of the window level set in said changing direction setting step.

6. An image processing method according to claim 4, further comprising a display control step of displaying a window width and the window level on a display device, as setting input values on the lateral axis and output values on the longitudinal axis,
   wherein said display control step is adapted to set the direction of the lateral axis based on the changing direction of the window level set in said first changing direction setting step or said second changing direction setting step.

7. A non-transitory computer readable medium that stores a computer program for an image processing method which changes a window level of an image associated with a range of an input pixel value of the image for an output pixel value on a display unit based on an operation by a user using an operation unit, said program comprising:
   a program code of an image input step of inputting an image using an image processor;
   a program code of a photometric interpretation judgment step of judging a definition of a photometric interpretation of the input image by which a changing direction of the window level is determined; and
   a program code of a changing direction setting step of reversing the changing direction of the window level to the predetermined operation of the user using the operation unit, according to whether the definition of the photometric interpretation of the input image indicates to display an input signal value "0" as black or white, on the basis of the judgment of the photometric interpretation judgment unit.

* * * * *